March 26, 1963

R. LUCIEN 3,082,980

MULTI-PURPOSE LANDING GEAR WITH WHEELS IN TANDEM

Filed May 19, 1959

March 26, 1963  R. LUCIEN  3,082,980
MULTI-PURPOSE LANDING GEAR WITH WHEELS IN TANDEM
Filed May 19, 1959  5 Sheets-Sheet 4

United States Patent Office 3,082,980
Patented Mar. 26, 1963

3,082,980
MULTI-PURPOSE LANDING GEAR WITH
WHEELS IN TANDEM
René Lucien, Neuilly-sur-Seine, France, assignor to Société à Responsabilité Limitée Recherches Etudes Production R.E.P., Paris, France, a corporation of France
Filed May 19, 1959, Ser. No. 814,246
Claims priority, application France Sept. 3, 1958
6 Claims. (Cl. 244—104)

The present invention relates to aircraft undercarriages having wheels coupled together in tandem.

An object of the invention is the provision of a shock absorber device designed for the above type of landing gear and capable of effecting, apart from the normal functions required of a shock absorber, the additional functions of retracting the undercarriage and adjustment of position and the height of the fuselage of the aircraft when the latter is resting on the ground, in order to facilitate, for example, loading or unloading.

The features of the landing gear of the invention further include the possibility of constituting a shock absorber to damp the pitching motion of an aircraft running on the ground.

A further object of the invention is to provide an undercarriage with tandem wheels constituting a complete assembly adapted for being fixed directly to the structure of the aircraft, and which is of a relatively simple mechanical and kinematic design despite the varied functions which it carries out.

An additional object of the invention is to provide an undercarriage complying with the above conditions and also capable of effecting turns on the ground without difficulty.

The landing gear in accordance with the invention is characterized by the fact that it comprises two identical elbowed levers, the arms of which are directed parallel to each other, placed one behind the other and pivotally mounted about two swivels at right angles to the plane of symmetry of the aircraft, rigidly fixed to the structure of said aircraft, one extremity of each lever arm carrying a wheel or a pair of wheels; and, further a tube, the axis of which is at right angles to the lever arms, rigidly fixed to the two swivels and rigidly fixed to the structure of the aircraft, the two other lever arms being coupled by means of a connecting rod to movable elements of a damper located in the interior of said tube.

The two levers being identical, the reactions resulting from contact of the wheels with the ground on the shock absorber are of equal value and produce, with respect to the front lever, a tractive action in the shock absorber and, with respect to the rear lever, a compression action. On account of this, the shock absorber is an entirely special type and constitutes in itself a characteristic feature of the invention.

The landing gear is illustrated by the figures of the accompanying drawings, in which:

FIG. 1 is a side view of an undercarriage on landing gear provided in accordance with an embodiment of the invention;

In FIG. 1, two elbowed levers 1 and 8 each including first and second arms are pivotally mounted at $A_1$ and $A_2$ to two swivels coupled together by a tube 9 provided at its two extremities with forks or extensions supporting the swivels or pivots $A_1$ and $A_2$.

This tube is rigidly fixed to the structure of the aircraft. The lower arms of the levers are the carrying struts at the extremities of which are mounted the wheels or pairs of wheels rotating respectively about the axes $O_1$ and $O_2$.

Figure 2:
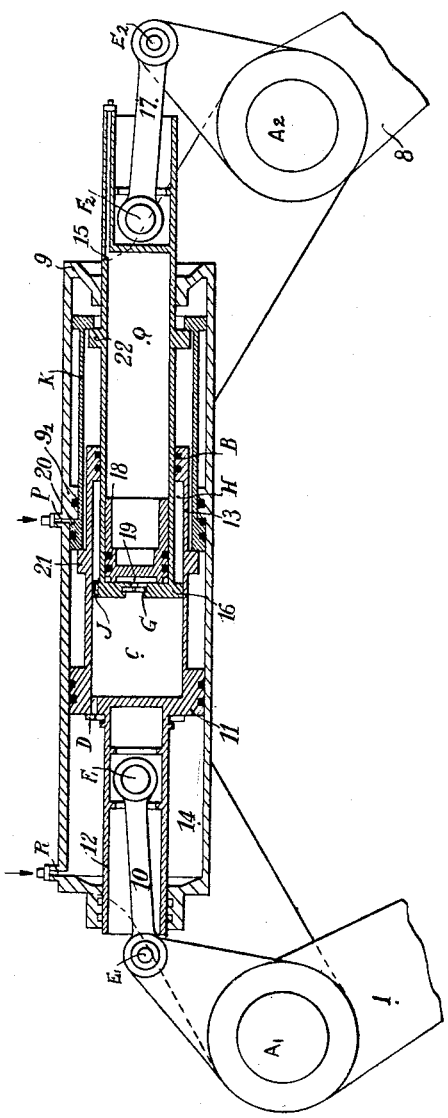
FIG. 2 is an enlarged view in cross-section of the shock absorber of the landing gear of FIG. 1.

The upper portion of each lever is coupled by a pivotal mounting $E_1$ and $E_2$ to a connecting rod 10 and 17 (FIG. 2), which is in turn coupled to the shock absorber by one of pivotal mountings $F_1$ and $F_2$ (FIG. 2). The shock absorber is internal with respect to the horizontal tube rigidly fixed to the structure of the aircraft. In FIG. 1 the undercarriage is shown with the wheels down and the shock absorber in its expanded position.

When the two wheels are forced back (when landing for example) these wheels pass from the position $O_1$ and $O_2$ to a position $a_1$ and $b_1$ or any other intermediate position.

As a result of this, the distance $L_0$ between the point $E_1$ of the front lever and the shock absorber increases and becomes $L_1$. A tractive effort is thus exerted by the connecting rod 10 upon the shock absorber. On the other hand, the distance $M_0$ between the point $E_2$ of the rear lever and the shock absorber decreases and becomes $M_1$ and a compressive force is exerted upon the shock absorber by the connecting rod 17. At the point of maximum extension of the shock absorber, the position of the two levers is fixed by internal abutments as will be explained below.

Figure 3:
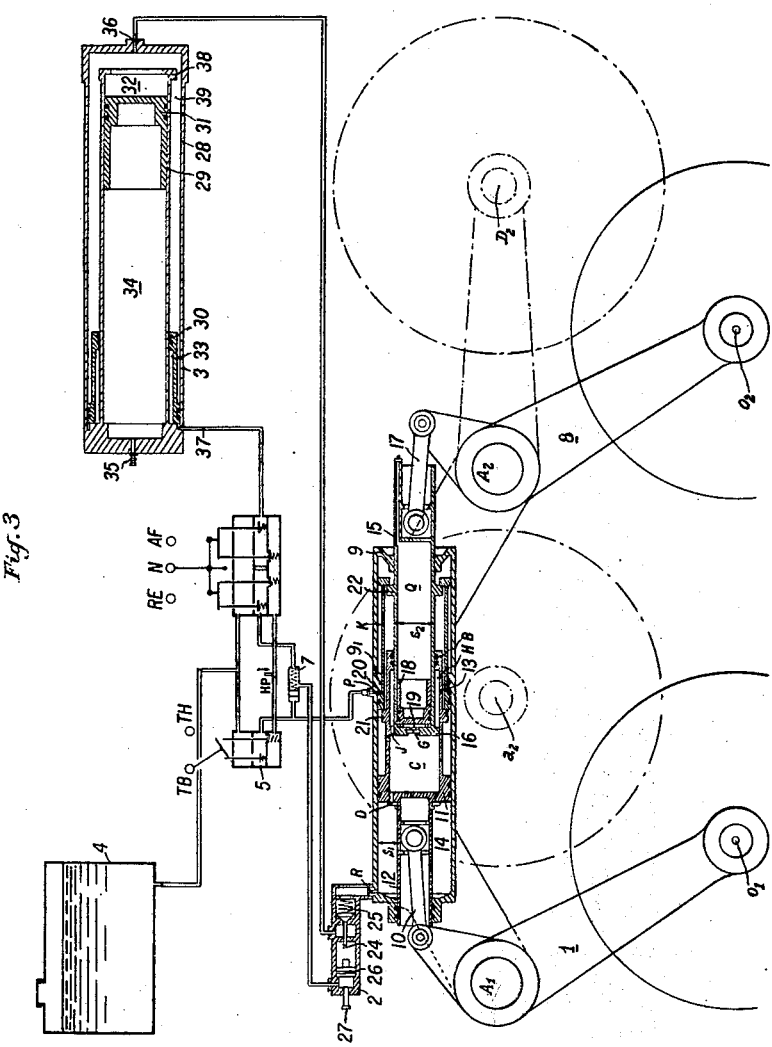
FIG. 3 is a view in cross-section of the overall assembly comprising the undercarriage, the shock absorber and the accessory units which enable the operation of the landing gear.

On the other hand, a piston internal with respect to this shock absorber conveys the pressure through a hydraulic circuit thus enabling the wheels to be raised up to a maximum position $a_2$ and $b_2$, as shown in FIG. 3. As a consequence the distance $L_0$ becomes $L_2$ and the distance $M_0$ becomes $M_2$.

The landing gear composed of the horizontal tube 9 containing the shock absorber and the two levers 1 and 8 carrying the wheels is rigidly fixed to the structure of the aircraft by means of conventional couplings (not shown).

The shock absorber contained in the horizontal tube is capable of carrying out the following different functions:

*Shock absorption.*—Absorption of energy in the course of landing or taxiing.

*Function for the damping of pitching.*—Damping of the differential movement of the two wheels or two sets of wheels one with respect to the other while running.

*Lifting jack function.*—For retracting the undercarriage into the aircraft during flight.

*Position-changing jack function.*—For the purpose of altering the trim of the aircraft on the ground, for example, lowering of the fuselage for loading.

In order to insure these various functions the shock absorber is controlled hydraulically by a certain device mounted as illustrated in FIG. 3 wherein the apparatus is in a condition corresponding to the position "Undercarriage Down" of the landing gear.

This arrangement is in any case precisely identical to the arrangement described in the co-pending patent application, Ser. No. 814,338, filed May 19, 1959, which arrangement comprises a shock absorber of a standard type but controlled hydraulically in the same manner. All the devices mentioned in the above noted patent being identical and operating in the same manner, with the exception of the shock absorber, only this latter will be described hereunder:

The shock absorber comprises in the interior of the tube 9 which is fixed with respect to the structure of the aircraft, a piston 11 rigidly connected to a hollow rod 12 and extended by a secondary cylinder 13 provided with a packing gland carrier B. The rod 12 is actuated by the connecting rod 10 pivotally mounted on the front lever 1. A hollow rod 15 rigidly fixed to a piston 16 is operated by the connecting rod 17 pivotally mounted on the rear lever 8. This rod 15 slides in the packing gland carrier B of the secondary cylinder 13 and the piston 16 of the rod 15 slides in the secondary cylinder 13.

On the other hand a free piston 18 separates the oil under pressure of the chamber 19 from the compressed air with which the chamber Q is filled and which insures the elasticity of the suspension.

A sleeve K is interposed between the tube 9 and the cylinder 13. Its sliding motion towards the right is limited by an internal shoulder $9_1$ of the tube. A shoulder 21 of the cylinder 13, in its position of abutment against an extremity of the sleeve K, defines the "Wheel Down" position of the lever 1 and a shoulder 22 of the tube 15 butts against the flange terminating the other extremity of the sleeve and defines the "Wheel Down" position of the lever 8. In the extremity of the sleeve is formed a small cavity 20 which is coupled at P through the sleeve by means of a pipe to the lifting distributor 5 and trim-changing distributor 6. In addition, the controlled valve 2 of the distribution system is coupled at R to the front extremity of the tube 9.

In the position shown, the lifting distributor being in "Undercarriage Down" position TB and the trim-changing distributor being in the neutral position N, all the circuits communicate with the tank 4; the valve 2 is closed.

It may be appreciated that if, as a result of contact of the front wheel with the ground, an effort is exerted on this latter thus tending to draw the wheel closer to the aircraft, oil passes from the chamber 14 which decreases in volume, into the chamber C through the restricted orifices of a valve D.

On the other hand, as the rod 15 is motionless, being maintained by the pressure existing in the chamber C, the chamber C increase in volume when the piston 11 is displaced. The annular section $S_1$ of the chamber 14 is so constructed as to be twice the external section $S_2$ of the rod 15. Therefore one half the volume of oil issuing from the chamber 14 will remain in the chamber C due to the increase in volume of this latter, while the other half of the liquid passes from the chamber C into the chamber 19 through the orifice of the valve G and compressing the air of the chamber Q through the intermediary of the piston 18. The effort on the wheel is therefore balanced by a force which is proportional to the pressure in air of the chamber Q and to the difference of section $S_1-S_2$, that is, $$\frac{S_1}{2}$$

If an effort is now applied to the rear wheel so as to bring said wheel back to the same level as the front wheel without causing this latter to move, it may be seen that the oil of chamber C will pass into the chamber 19 through the wiredrawing orifice of the valve G by again compressing the air of the chamber Q through the intermediary of the piston 18. The effort on the rear wheel is therefore balanced by a force which is proportional to the pressure of the chamber Q and to the section $S_2$, or again $$\frac{S_1}{2}$$

Identical efforts on the two wheels are therefore evenly balanced in the interior of the shock absorber by the pressure of air of the chamber Q, thus effecting the suspension of the undercarriage. The passage of oil through the ports of the valves D and G while the wheels are in motion effects the shock absorbing or damping action.

It may also be seen that, if there is a differential movement of one wheel with respect to the other, there is produced a displacement of the piston 16 and of the rod 15 with respect to the secondary cylinder 13. There is therefore a displacement of oil from the chamber C towards the chamber H or vice versa through an orifice J of the piston 16. The braking action which is due to this restricted movement of oil damps the differential movements of the wheels and also therefore the pitching motion of the undercarriage.

The retraction of the undercarriage is obtained by setting the distributor 5 at the position TH thus putting the orifice P into communication with the high pressure HP. This latter acts at the same time as a result of the operation of the valves 7 and 2 so as to open the valve 24 which puts R into communication with the orifice 36 of the cylinder 3. The sleeve K is forced towards the left thus driving the rod 15 and the cylinder 13 and thus lifting the front and rear wheels together.

The lowering of the undercarriage is effected by the reverse operation, by setting the distributor 5 at the position TB which again puts the orifice P into communication with the tank 4 thus enabling the oil from the cylinder, forced back by the expansion of air of the chamber 34, to resume its position in the shock absorber.

The trim-changing operation is also carried out as shown in the above mentioned patent.

In order to drop the level of the deck of the aircraft, the lever of the distributor 6 is set at the position AF. The high pressure HP acts on the controlled valve 2 and opens the valve 24. The oil is forced into the chamber 32 of the cylinder 3 by the contraction of the chamber 14 under the effect of the weight of the aircraft. The operation may be interrupted at any time by restoring the distributor 6 to its neutral position N. In order to raise the deck of the aircraft, the trim-changing distributor lever is set on the contrary at the raising position RE. The high pressure is sent into the chamber 33 of the cylinder 3 which results in the displacement of the piston 30 by forcing the liquid of the chamber 39 towards chambers 14, C and 19 of the shock absorber after having opened the clapper 24. When the piston 30 comes up against the stop 38, the quantity of oil which has entered the shock absorber is equal to that which initially left said shock absorber during the trim-lowering operation. The shock absorber is then in a condition which is identical to its condition before lowering. At the end of this operation the trim-changing device should be restored to the neutral position N, thus enabling the piston 31 of the cylinder 3 to force the oil from the chamber 32 towards the chamber 39 due to the expansion of air of the chamber 34 while the oil of the chamber 33 returns to the tank. When the displacement of the pistons is completed the assembly of circuits reverts to an arrangement corresponding to the ground running of the aircraft. It should be noted that the raising operation may be stopped at any moment before the aircraft is restored to its normal trim, by bringing the lever of the trim-changing distributor back from the position RE to the position N.

It has been observed that changes of direction on the ground of aircraft having undercarriages with tandem wheels are difficult to accomplish owing to the fixed orientation of the plane of these wheels. The undercarriage in accordance with the invention overcomes this disadvantage due to the fact that one of the wheels of the tandem is adjustable about a vertical or substantially vertical axis located in front of the shaft of this wheel.

The use of the term "wheel" is understood to mean both a single wheel and a pair of twin wheels rotating about a same shaft and mounted on each side of the carrying strut.

The facility of making changes in direction is obtained by constructing the strut which carries the wheel in question in the form of two members pivotally mounted with respect to each other about a vertical or substantially vertical axis located in front of the shaft of the wheel.

Figure 4:
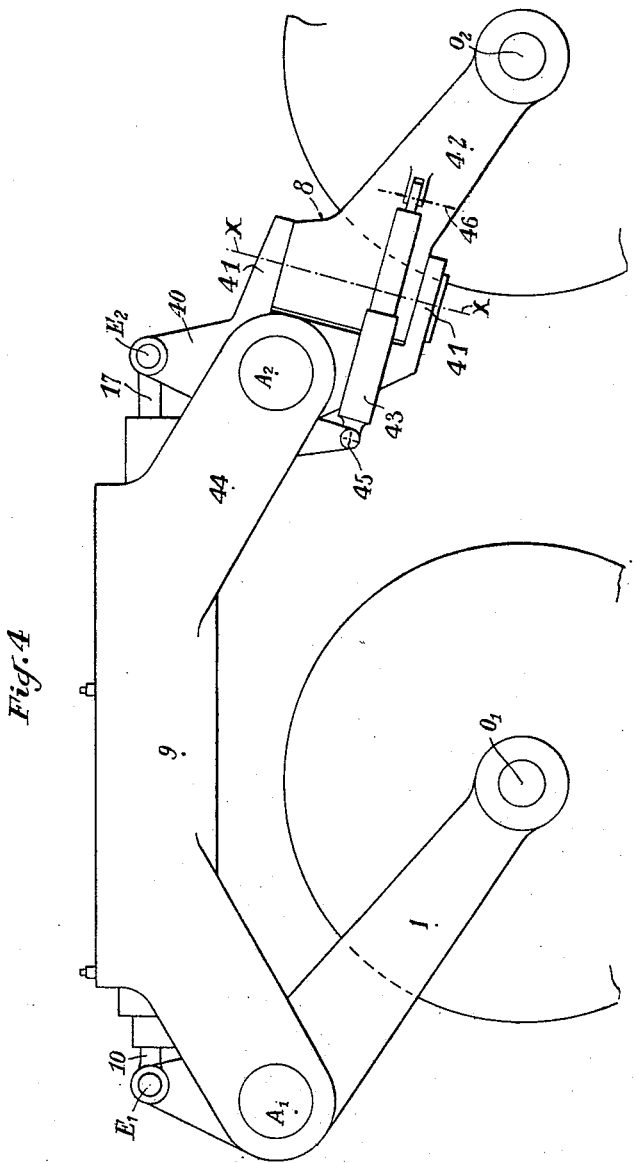
FIGS. 4 and 5 show respectively in elevation and in plan view a device for facilitating turning.
Figure 5:
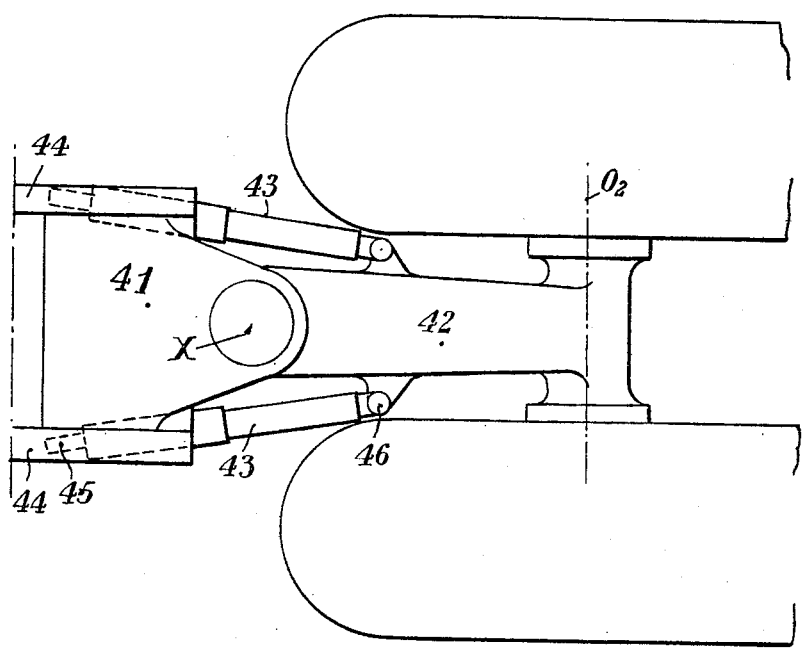

In accordance with the invention, the lever 8 carrying the rear wheels is constituted by a portion pivoting about the shaft $A_2$ (FIG. 4), provided with an arm 40 pivotally mounted at $E_2$ on the rod 17 and a forked member 41 in which is mounted an arm 42 pivotally mounted about an axis XX at right angles to the shaft $A_2$.

By virtue of this arrangement, when the aircraft taxies along the ground, the rear wheels themselves take the proper direction for turning. A pair of elastic fastening members 43 pivotally mounted on shaft 45 on the fork 41 of the body 9 parallel to the shaft $A_2$ and on the other hand on the element 42 about axes 46 parallel to the axis XX, restores the rear wheels when they leave the ground to planes parallel to those of the front wheels of the undercarriage.

The inclination of the axis XX should preferably be chosen so that the axis is in a substantially vertical position when the aircraft is at rest under normal load on a horizontal plane.

What is claimed is:

1. In a landing gear arrangement for an aircraft: wheels arranged in tandem, a tube affixed to said aircraft, extensions on said tube, pivots on said extensions, levers on said pivots and connected to said wheels, a piston displaceable in said tube, a hollow rod on said piston extending axially therefrom, a connecting rod pivoted to said hollow rod and extending outwardly therefrom, a pivotal connection between said connecting rod and one of said levers, a cylinder on said piston, a second piston in said cylinder, a second hollow rod on said second piston, a packing gland in said cylinder supporting said second hollow rod, a third piston in said second hollow rod and dividing the same into first and second chambers, the first chamber adjoining said second piston, a second connecting rod pivotally connected to said second hollow rod within the same and the other of said levers, a sleeve within said tube encircling said second hollow rod and adapted to accommodate a penetration of said cylinder between said sleeve and second hollow rod, the first said hollow rod and piston defining an annular chamber in said tube, means for supplying pressure fluid to said annular chamber, said second piston confining a further chamber in said cylinder adjoining the first said piston, a valve in the first said piston connecting said annular and further chambers, a valve in said second piston connecting said further chamber with the first chamber in said second hollow rod, said tube and sleeve defining an opening, means for supplying a pressure fluid to said opening, and means to limit relative displacements between said tube, sleeve and second hollow rod.

2. In an aircraft, a landing gear arrangement comprising wheels arranged in tandem, a tube affixed to said aircraft, extensions on said tube, levers arranged in tandem and pivoted to said extensions, a piston displaceable in said tube, a hollow rod and a cylinder on opposite sides of said piston, a connecting rod pivoted to said hollow rod, said connecting rod being pivotally connected to one of said levers, a second piston in said cylinder, a second hollow rod extending from said second piston, a packing gland in said cylinder supporting said second hollow rod, a third piston in said second hollow rod and dividing the same into first and second chambers, the first chamber adjoining said second piston, a second connecting rod pivotally connected to said second hollow rod and to the other of said levers, a sleeve within said tube encircling said second hollow rod and adapted to accommodate a penetration of said cylinder between said sleeve and second hollow rod, the first said hollow rod and piston defining an annular chamber in said tube, means for supplying pressure fluid to said annular chamber, said second piston confining a further chamber in said cylinder adjoining the first said piston, a valve in the first said piston connecting said annular and further chambers, a valve in said second piston connecting said further chamber with the first chamber in said second hollow rod, and cooperating abutments on said tube, second hollow rod and sleeve to limit relative displacements thereof.

3. For use with a landing gear arrangement for an aircraft including wheels arranged in tandem, pivots fixed relative to said aircraft, and levers arranged in tandem on said pivots, apparatus comprising a tube affixed to said aircraft, a piston displaceable in said tube, a hollow rod on said piston extending axially therefrom in said tube, a connecting rod pivoted to said hollow rod and to one of said levers, a cylinder on said piston, a second piston in said cylinder, a second hollow rod extending axially from said second piston in said cylinder, a third piston in said second hollow rod and dividing the same into first and second chambers, the first chamber adjoining said second piston, a second connecting rod pivotally connected to said second hollow rod and to the other of said levers, a sleeve within said tube encircling said second hollow rod, an outwardly protruding abutment on said cylinder adapted to abut against an end of said sleeve with said cylinder extending into said sleeve, cooperating abutments on said tube and said sleeve to limit axial displacement of the sleeve relative to said tube, cooperating abutments on said sleeve and second hollow rod to limit displacement therebetween, the first said hollow rod and piston defining an annular chamber in said tube, means for supplying pressure fluid to said annular chamber, said second piston confining a further chamber in said cylinder adjoining the first said piston, a valve in the first said piston connecting said annular and further chambers, a valve in said second piston connecting said further chamber with the first chamber in said second hollow rod, the cooperating abutments on said tube and sleeve defining an opening, and means for supplying a pressure fluid to said opening, a pressure medium being provided in the second hollow tube.

4. A landing gear arrangement for an aircraft comprising wheels arranged in tandem, a substantially horizontal tube affixed to said aircraft, extensions on said tube, pivots on said extensions and spaced axially from opposite ends of said tube and below the level of the same, elbowed levers arranged in tandem on said pivots, said levers including first arms connected to said wheels and second arms, a piston displaceable in said tube, a hollow rod on said piston extending axially therefrom in said tube, a connecting rod pivoted to said hollow rod within the same and extending outwardly therefrom, a pivotal connection between said connecting rod and the second arm of one of said elbowed levers, a secondary cylinder on said piston and extending axially therefrom away from said hollow rod and within said tube, a second piston in said cylinder, a second hollow rod extending axially from said second piston in the same general direction as said cylinder, a packing gland in said cylinder supporting said second hollow rod, a third piston in said second hollow rod and dividing the same into first and second chambers, the first chamber adjoining said second piston, a second connecting rod pivotally connected to said second hollow rod within the same and to the second arm of the other of said elbowed levers, a sleeve within said tube encircling said second hollow rod and adapted to accommodate a penetration of said cylinder between said sleeve and second hollow rod, a radially and outwardly protruding abutment on said cylinder adapted to abut against an end of said sleeve with said cylinder extending into said sleeve, cooperating abutments on said tube and said sleeve to limit axial displacement of the sleeve relative to said tube, cooperating abutments on said sleeve and second hollow rod to limit displacement therebetween, the first said hollow rod and piston defining an annular chamber in said tube, means for supplying pressure fluid to said annular chamber, said second piston confining a further chamber in said cylinder adjoining the first said piston, a valve in the first said piston connecting said annular and further chambers, a valve in said second piston connecting said further chamber with the first chamber in said second hollow rod, the cooperating abutments on said tube and sleeve defining an opening, means for supplying a pressure fluid to said opening, and means sealing the second hollow tube to trap a pressure medium therein.

5. In a landing gear arrangement for an aircraft: wheels arranged in tandem, means affixed to said aircraft and defining a tubular bore, pivots on said means, levers on said pivots and connected to said wheels, a piston displaceable in said bore, a connecting rod pivoted to said piston and extending axially therefrom, a pivotal connection between said connecting rod and one of said levers, a cylinder on said piston, a second piston in said cylinder, a hollow member extending axially from said second piston, a third piston in said hollow member and dividing the same into first and second chambers, a pressure medium in the second chamber, the first chamber adjoining said second piston, a second connecting rod pivotally connecting said hollow member and the other of said levers, the first said piston defining an annular chamber in the bore of said means, said second piston confining a chamber in said cylinder adjoining the first said piston, a valve in the first said piston connecting said annular chamber and the chamber in said cylinder, a valve in said second piston connecting the chamber in said cylinder with the first chamber in said hollow member, and means for supplying a pressure fluid to said annular chamber.

6. Apparatus comprising wheels arranged in tandem and defining respective axes of rotation, pivot means arranged in tandem and parallel to said axes of rotation, levers pivotable in clockwise and counterclockwise direction on said pivot means and connected to said wheels, interengaged shock absorption means coupled respectively to said levers and being respectively subjected to tension and compression by like movements of said levers about said pivot means in one direction and to compression and tension by movements of said levers in opposite direction, said interengaged means comprising telescopically engaged members adapted for compressing a pressure medium therebetween whereby each lever is acted upon by movement of the other lever, and means connecting one of said wheels to the associated lever and enabling the latter said wheel to turn about an axis perpendicular to its axis of rotation.

References Cited in the file of this patent

UNITED STATES PATENTS

| | | |
|---|---|---|
| 1,600,154 | Van Vliet | Sept. 14, 1926 |
| 1,853,232 | Schwarz | Apr. 12, 1932 |
| 2,130,914 | Warren | Sept. 20, 1938 |
| 2,481,521 | Larison | Sept. 13, 1949 |
| 2,578,200 | Nicholl | Dec. 11, 1951 |
| 2,624,533 | Brader | Jan. 6, 1953 |
| 2,650,782 | Fehring | Sept. 1, 1953 |

FOREIGN PATENTS

| | | |
|---|---|---|
| 467,309 | Germany | Oct. 23, 1928 |